June 12, 1962  B. L. JOHNSON ETAL  3,038,845
CONTROLLED ELEMENT ACTUATOR
Filed March 11, 1957  3 Sheets-Sheet 1
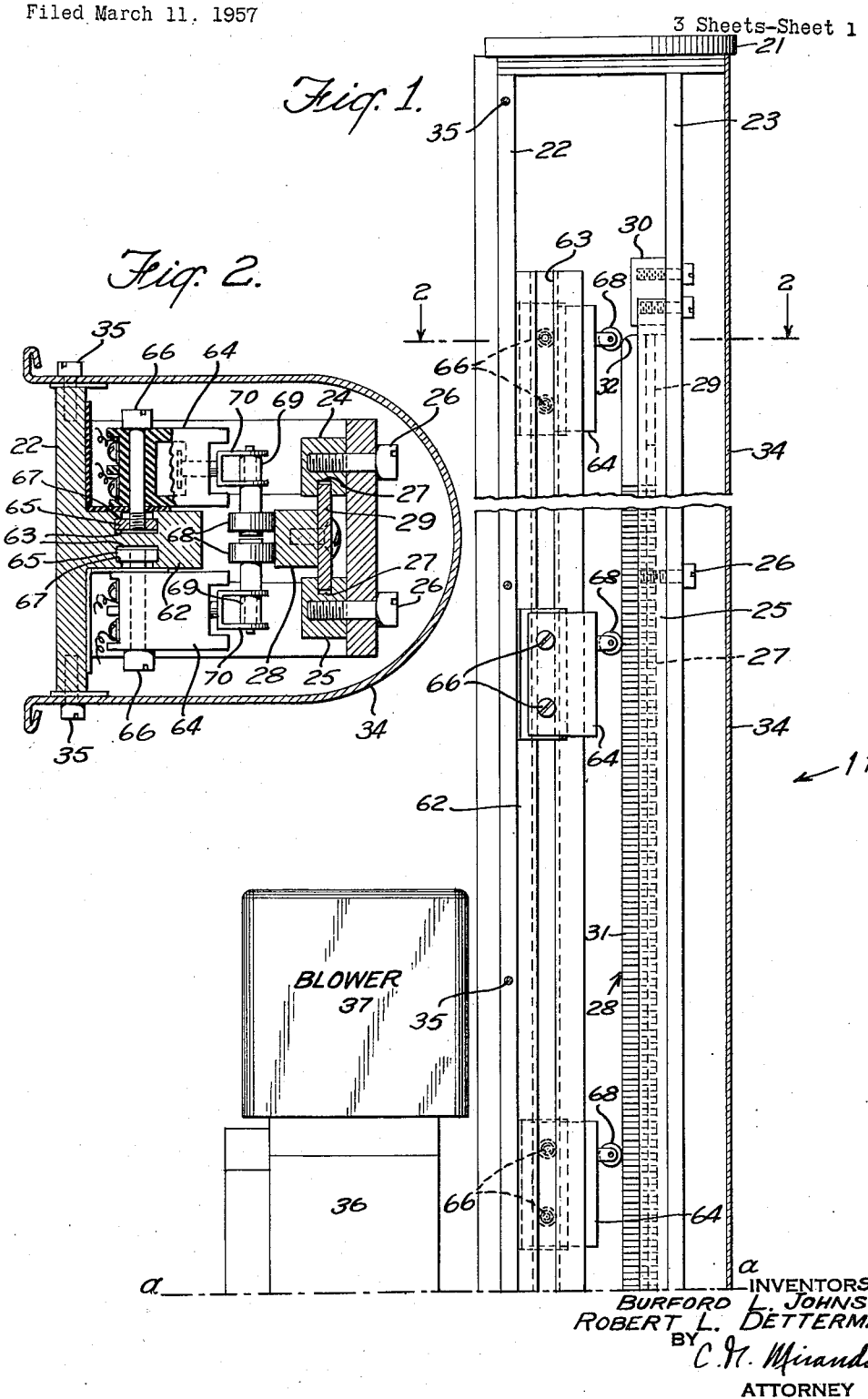
INVENTORS
BURFORD L. JOHNSON
ROBERT L. DETTERMAN
BY
C. H. Miranda
ATTORNEY June 12, 1962  B. L. JOHNSON ET AL  3,038,845
CONTROLLED ELEMENT ACTUATOR
Filed March 11, 1957  3 Sheets-Sheet 2

INVENTORS
BURFORD L. JOHNSON
ROBERT L. DETTERMAN
BY C. N. Miranda
ATTORNEY

June 12, 1962 B. L. JOHNSON ETAL 3,038,845
CONTROLLED ELEMENT ACTUATOR
Filed March 11, 1957 3 Sheets-Sheet 3

INVENTORS
BURFORD L. JOHNSON
ROBERT L. DETTERMAN
BY
C. M. Miranda
ATTORNEY

United States Patent Office 3,038,845
Patented June 12, 1962

3,038,845
CONTROLLED ELEMENT ACTUATOR
Burford L. Johnson, Bronx, N.Y., and Robert L. Detterman, North Bergen, N.J., assignors, by mesne assignments, to the United States of America as represented by the United States Atomic Energy Commission
Filed Mar. 11, 1957, Ser. No. 645,195
7 Claims. (Cl. 204—193.2)

This invention relates to nuclear reactors and more particularly to actuators for control elements employed in regulating and protecting nuclear reactors.

Nuclear reactors require the use of control elements which serve to increase or decrease the rate of nuclear reactions to control the power output and power level of these reactors. The control elements in the art presently take the form of safety shim and regulating rods when they are used to protect the reactor; the shim rods coarsely adjusting the rate of nuclear reactions and the regulating rods to accurately regulate such rate. The rods are adapted for insertion into and withdrawal from the reactor by actuators which are mounted outside the reactor. The number of control rods depends upon the design of the particular reactor but regardless of the number, the actuators for such rods must be brought into close proximity with each other because of required arrangement of the rods, when in operable positions in the reactors. The actuators generally comprise an actuating element which may have an extension member secured thereto and, in turn, a control element secured to the extension member. A motor is utilized for linearly moving the actuating element, and thus, the extension member and control rods. The motors, as a rule, are mounted on the actuator support plate at some distance from the actuating element, and are connected to the latter by long shaft members disposed normal to the element. The motors are placed at some distance away from the actuating elements because of the required proximity of such elements which, in some instances, makes it mandatory to position the elements on three inch centers. The positioning of the motors and shaft members with respect to the actuating elements to obviate interference of parts oftentimes presents difficult problems in layout and arrangement of the parts.

An object of the present invention is the provision of a novel and compact control rod actuator for nuclear reactors.

The present invention, therefore, contemplates a control element actuator which comprises an elongated housing having an actuating element adapted for effecting insertion into and withdrawal from a nuclear reactor of a control element. The housing is swivelly mounted on an actuator support plate and has secured thereon an electric motor which is connected for driving the actuating element. A pair of guide rails are provided in the housing and accommodate the actuating element therebetween for movement in a linear path. A third rail member is arranged in the housing parallel to the pair of guide rails and carries thereon at least one electrical limit or positioning switch which has a switch making and breaking element adapted for engagement with the actuating element. The switches are mounted on the third rail and are continuously adjustable over substantially the entire stroke of the actuating member to provide maximum range of adjustment.

The above and other objects and advantages of the present invention will appear more fully hereinafter from a detailed description which follows, taken together with the accompanying drawings wherein one embodiment of the invention is illustrated.

In the drawings, wherein like reference characters refer to like parts throughout the several views;

FIGS. 1 and 1A are side elevational views of the upper and lower portions, respectively, of a control element actuator according to the present invention, with portions thereof broken away;

FIG. 2 is a transverse view, in section, taken along the line 2—2 of FIG. 1;

Figure 1A:
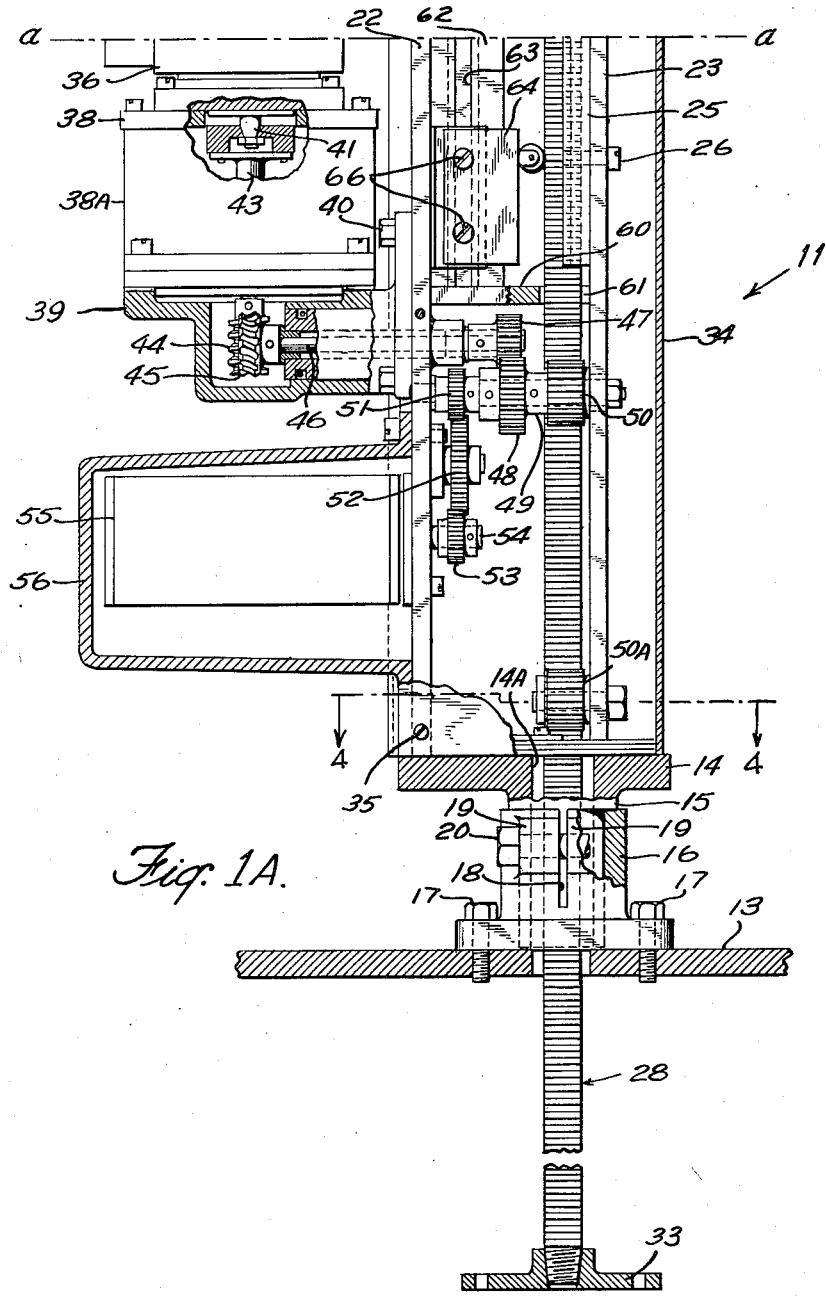

Referring now to the drawings for a more detailed description of the present invention and more particularly to FIGS. 1 and 1A wherein one embodiment hereof is clearly illustrated, a control element actuator, generally designated by the numeral 11, is adapted for mounting on an actuator support plate 13 (partially shown) of a nuclear reactor (not shown). Actuator 11 comprises a base plate 14 having an opening 14A therein. Depending from base plate 14 is a foot member 15 which is seated in a swivel socket member 16. Socket member 16 is secured to actuator support plate 13 by means of threaded members 17 and the upper portion of the socket member is slotted as at 18. A pair of internally threaded lugs 19 are disposed on diametrically opposite sides of socket member 16 and accommodate threaded members 20. By reason of the foregoing construction of the socket member, actuator 11 may be swivelled to different angular positions upon the loosening of threaded members 20. When it is desired to maintain actuator 11 in one position, threaded members 20 are turned in the proper direction to tighten the slotted halves of socket member 16, to thereby cause the latter to press against and restrain movement of foot member 15.

A top plate 21 (FIG. 1) is disposed parallel to base plate 14 and provided between the two plates are a pair of upstanding frame members 22 and 23. A pair of spaced and parallel guide rails 24 and 25 are secured to frame members 23 by threaded members 26. Guide rails 24 and 25 are each provided with a groove portion 27 on the adjacent surfaces thereof and the grooves extend from the upper ends of said guide rails to the lower ends. An actuating member or toothed rack 28 is disposed between the guide rails 24 and 25 and has secured adjacent its upper end a guide plate member 29 (FIG. 2) which has the opposite longitudinal edges thereof accommodated within grooved portions 27. Rack 28 is adapted for linear movement and is limited in its upward direction by a stop-block 30 secured to frame member 23. Rack 28 is provided with a toothed surface 31 and has at its upper end a bevelled surface 32, while its lower end is shaped circular in cross section and is threaded to accommodate a connecting flange member 33 which extends below the support plate 13 for connection to an extension rod (not shown) and a safety rod (not shown).

Figure 3:
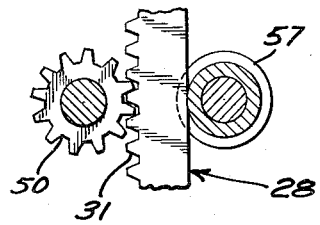
FIG. 3 is a fragmentary view, in side elevation, of the actuating element in FIG. 1A and showing a driving pinion and guide roller in engagement with the actuating element.
Figure 4:
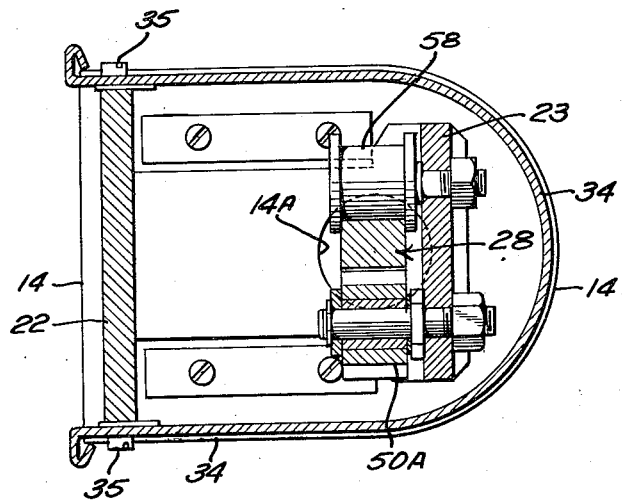
FIG. 4 is a transverse view, in section, taken along the line 4—4 of FIG 1A.

A substantially U-shaped housing 34 is provided for actuator 11 and the ends of the housing are secured to frame member 22 by threaded members 35, as seen in FIGS. 2 and 4. A reversible two-phase servo motor 36 is disposed outside of housing 34 and is arranged with its shaft axis in a vertical direction. An air blower 37 is provided on the upper portion of motor 36 and the latter is mounted on a plate 38 which comprises part of a housing 38A for a reduction gear train assembly (not shown). Housing 38A, in turn is supported on a casing 39 which is secured to frame member 22 by threaded members 40. One end of motor shaft 41 is shown in FIG. 1A, connected to an input member 43 of the reduction gear assembly, and an output member 44 of the reduction gear assembly, as for example a worm, extends into casing 39. Worm 44 meshes with a worm gear 45, secured to a shaft 46, which extends through frame member 22 into housing 34 of actuator 11. The other end of shaft 46 is provided with a pinion 47 which meshes with a gear 48 secured to a shaft 49 having its ends journalled in frame members 22 and 23. A pinion 50 is secured to shaft 49, adjacent frame member 23, and meshes with the toothed surface 31 of rack 28 to move the latter in vertical directions. A pinion 51 also is secured to shaft 49, adjacent frame member 22, for engagement with an intermediate gear 52 which meshes with a pinion 53 secured to the shaft 54 of an electrical position sensing means 55, as for example a potentiometer, enclosed within a protective casing 56. Toothed surface 31 of rack 28 also is engaged by a pinion 50A, disposed adjacent the base plate 14 of actuator 11. Guide rollers 57 and 58 (FIGS. 3 and 4) are provided for engaging the surface of rack 28, opposite the toothed surface 31, and are disposed adjacent pinions 50 and 50A, respectively.

A dividing plate 60 is arranged transversely of frame members 22 and 23 and separates the lower portion of the actuator, containing the gear assembly described hereinabove, from the upper portion of the actuator. Plate 60 is provided with an opening 61 adjacent frame member 23 to allow passage of rack 28 therethrough. A third rail 62 is mounted on frame member 22 and is arranged parallel to and opposite rack 28. Rail 62 is provided with a pair of grooves or keyways 63 on the opposite sides thereof. A plurality of double throw limit switches, as for example, micro switches 64, are accommodated by the keyways 63 and are adjustable for movement therein. Each of the micro switches 64 (FIG. 2) has associated therewith a nut plate 65 which is positioned in keyway 63 and the micro switches are further provided with threaded members 66 which pass through the switch body to engage the nut plates 65. The micro switches 64 are adjustable throughout substantially the entire stroke of rack 28 and this is accomplished by turning the threaded elements 66 in a direction to displace nut plates 65 away from shoulders 67 of the keyways. When the nut plates are moved in a direction away from the micro switches, the latter are slidable along the third rail 62 to the desired position. Switches 64 each have a switch making and breaking element, as for example roller 68, which is adapted for engagement with a smooth surface of rack 28, as clearly seen in FIG. 2. Transverse displacement of a shaft 69 carrying roller 68 transmits its motion through a bifurcated bracket member 70 to operate the switch.

It may be seen from the drawings that a pair of micro switches 64 are mounted on either side of third rail 62 but it is to be understood that the same is for purposes of illustration only, in that one or more may be mounted on said rail. Furthermore, the micro switches 64 may function in a circuit in a number of ways, as for example to provide an indication of the position of rack 28 and/or cut off the power to motor 36 when the rack reaches its extreme positions of travel.

Figure 5:
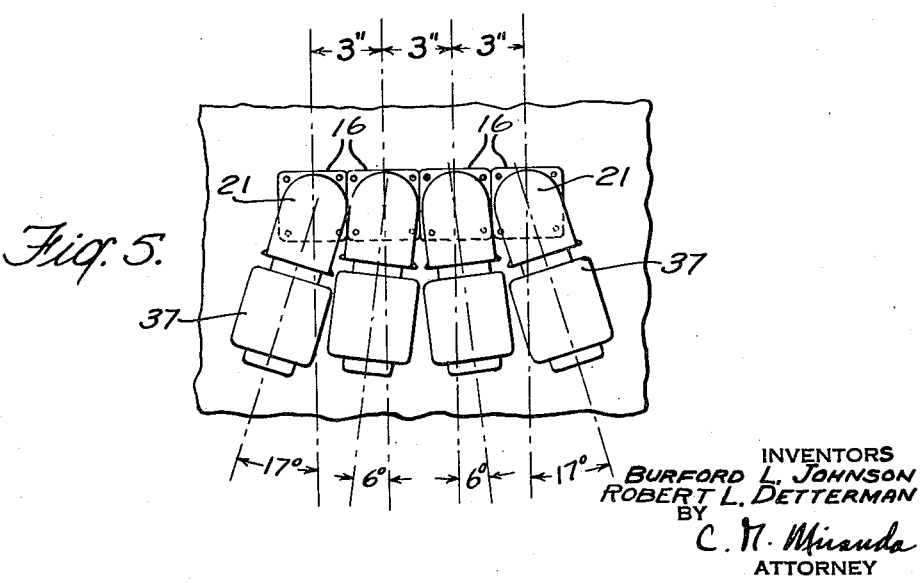
FIG. 5 is a top plan view of one row of the novel control element actuators mounted on the actuator support plate of a nuclear reactor.

FIGURE 5 discloses a row of four actuators which are mounted on three-inch centers to illustrate a compact and obstruction-free arrangement of the actuators on an actuator support plate. It is to be understood, however, that the distances between centers and the angularity of the actuators as shown in the drawing are not to be construed as limited to the values indicated, but rather, the same are shown merely by way of example.

In operation, movement of rack 28 from the position shown in FIGS. 1 and 1A to effect the insertion of the control element (not shown), connected to the extension rod (not shown), into the reactor is accomplished by providing the motor with a command signal of proper magnitude and phase. Dependent upon the magnitude of the signal and the phase thereof, rack 28 is driven from the motor, through the reducer gear assembly (not shown) in housing 38A, worm 44 and worm gear 45, and through the intermediate gearing arrangement a predetermined distance out of housing 34. When it is desired to withdraw the control element from the reactor, a signal of opposite phase is fed to the motor 36 which then effects movement of rack 28 upwardly in the housing 34 of actuator 11. In the event of de-energization of motor 36, the load on rack 28 cannot drive the de-energized motor through the intermediate gear arrangement because of the worm 44 and worm gear 45. The pitch of worm 44 is such that the worm and worm gear automatically locks the rack due to load on the latter when the motor is de-energized. The intermediate switches 64 shown in FIGS. 1 and 1A could be employed, if desired, to indicate the intermediate positions of rack 28 by connecting the same to indicating instruments, remote from the reactor. Similarly, position sensing means 55 may be employed to provide an indication of the various positions of the rack 28 in the housing 34.

From the foregoing, it is apparent that the present invention provides a novel and compact actuator for control elements for a nuclear reactor whereby a plurality of actuators may be easily mounted in extremely close positions on an actuator support plate. The provision of means to effect angular adjustment or swivelling of the actuators, together with the construction of the housing and location of the motors, readily lends to easy installation of the actuators.

Although but one embodiment of the invention has been illustrated and described in detail, various changes and modifications in the form and relative arrangement of parts, which will now appear to those skilled in the art, may be made without departing from the spirit and scope of the present invention.

What is claimed is:

1. In a controlled element actuator apparatus for use with nuclear reactors having an actuator support plate and a control element inserted into and withdrawn from the reactor, said control element being connected to an extension rod, an elongated housing having a longitudinal axis disposed normal to the actuator support plate and mounted thereon, a foot member extending from the bottom of said housing and coaxially therewith, a socket member for said foot member and secured to said actuator support plate for allowing swivelling movement of said foot member and said housing about the longitudinal axis of the latter and with respect to the actuator plate, means on said socket member for restraining swivelling movement of said foot portion and said housing, an actuating member movable along the axis of the housing into and out of said housing through said foot and said socket members, said actuating member having a connection at one end thereof for securing the extension rod thereto, a motor mounted on said housing means interconnecting said motor and said actuating member to move the latter, and electrical switch means having a switch making and breaking element engaging the actuating member.

2. A controlled element actuator apparatus for use with nuclear reactors and having an actuator support plate and a control element inserted into and withdrawn from the reactor, said control element being connected to an extension rod, an elongated housing having a longitudinal axis disposed normal to the actuator support plate and mounted thereon, a foot member extending from the bottom of said housing and coaxially therewith, a socket member for said foot member and secured to said actuator support plate for allowing swivelling movement of said foot member and said housing about the longitudinal axis of the latter and with respect to the actuator plate, means for restraining swivelling movement of said foot portion and said housing, an actuating member movable longitudinally in said housing and having a connection at one end thereof for securing the extension rod thereto, a motor mounted on the housing, means interconnecting said motor with said actuating member to move the latter, and an electrical switch disposed in said housing and having a switch making and breaking element engaging the actuating member.

3. A controlled element actuator apparatus for use with nuclear reactors and having an actuator support plate and a control element inserted into and withdrawn from the reactor, said control element being connected to an extension rod, an elongated housing having a longitudinal axis disposed normal to the actuator support plate and mounted thereon, a foot member extending from the bottom of said housing and coaxially therewith, a socket member for said foot member and secured to said actuator support plate for allowing swivelling movement of said foot member and said housing about the longitudinal axis of the latter and with respect to the actuator plate, means for restraining swivelling movement of said foot portion and said housing, a toothed rack member movable longitudinally in said housing and having a connection at one end thereof for securing the extension rod thereto, a motor mounted on said housing motion transmitting means having an input member connected for operation by the motor and an output member in engagement with the rack member for moving the latter, and an electrical switch disposed in said housing and having a switch making and breaking element engaging with the rack member.

4. A controlled element actuator apparatus for use with nuclear reactors and having an actuator support plate and a control element inserted into and withdrawn from the reactor, said control element being connected to an extension rod, an elongated housing having a longitudinal axis disposed normal to the actuator support plate and mounted thereon, a foot member extending from the bottom of said housing and coaxially therewith, a socket member for said foot member and secured to said actuator support plate for allowing swivelling movement of said foot member and said housing about the longitudinal axis of the latter end with respect to the actuator plate, means for restraining swivelling movement of said foot portion and said housing, a pair of parallel guide rails longitudinally disposed in and secured within said housing, an actuating member positioned in between said guide rails and movable relative thereto in the housing, said actuating member having a connection at one end thereof for securing the extension rod thereto, a guide member secured to said actuating member and cooperating with the adjacent guide rails, a motor mounted on the housing, means interconnecting said motor with said actuating member to move the latter, a third rail extending longitudinally in and secured within said housing and an electrical switch located on said third rail and having a switch making and breaking element engaging said actuating member.

5. The device set forth in claim 4, with both of the guide rails having a groove formed therein for accommodating the guide member on said actuating member, and means provided for effecting sliding adjustment of the switch along the third rail.

6. A controlled element actuator apparatus for use with nuclear reactors and having an actuator support plate and a control element inserted into and withdrawn from the reactor, said control element being connected to an extension rod, an elongated housing having a longitudinal axis disposed normal to the actuator support plate and mounted thereon, a foot member extending from the bottom of said housing and coaxially therewith, a socket member for said foot member and secured to said actuator support plate for allowing swivelling movement of said foot member and said housing about the longitudinal axis of the latter and with respect to the actuator plate, means for restraining swivelling movement of said foot portion and said housing, a pair of parallel guide rails longitudinally disposed in and secured with said housing and having guide slots formed therein, an actuating member positioned between said guide rails and movable relative thereto into and out of said housing, said actuating member having a connection at one end thereof for securing the extension rod thereto, a guide member secured to said actuating member and cooperating with the adjacent guide rails, a motor mounted on the housing, means interconnecting said motor with said actuating member to move the latter, a third rail secured within said housing extending longitudinally thereof and having a keyway formed therein, an electrical switch having a switch making and breaking element engaging the actuating member, and clamping means for said switch and including an element slidable in said keyway and a threaded element cooperating with the slidable element, said threaded element when operated in one direction being effective to clamp said slidable element to the keyway to maintain the switch stationary and when operated in the other direction being effective to loosen said slidable element to permit sliding adjustment of the switch longitudinally of said third rail.

7. The device of claim 6 wherein a pair of keyways are provided in the third rail, and at least one electrical switch is associated with each of said keyways and has a switch making and breaking element engaging the actuating element.

References Cited in the file of this patent

Research Reactors (TID-5275), U.S. Government Printing Office, 1955, pages 44-47, 82, 165, 170-174, 299-303.

Nucleonics, vol. 14 (September 1956), page 145.

AECU-3170, U.S. AEC Report dated 1955, page 12.